United States Patent [19]

Delattre et al.

[11] 4,265,007

[45] May 5, 1981

[54] TOOL FOR RASPING

[75] Inventors: Marcel Delattre, Claix; Gerard Romagnolo, Eybens, both of France

[73] Assignee: Eurotungstene, Grenoble, France

[21] Appl. No.: 15,244

[22] Filed: Feb. 26, 1979

[30] Foreign Application Priority Data

Feb. 28, 1978 [FR] France .............................. 78 06564

[51] Int. Cl.³ .............................................. B26D 1/12
[52] U.S. Cl. ......................................... 29/79; 157/13;
407/43; 407/46
[58] Field of Search ................ 29/78, 79; 76/101 SM;
157/13; 407/43, 44, 46, 59, 60

[56] References Cited

U.S. PATENT DOCUMENTS

| | | | |
|---|---|---|---|
| 1,379,146 | 5/1921 | West et al. | 29/78 |
| 2,489,803 | 11/1949 | Neilsen | 29/78 |
| 2,842,833 | 7/1958 | Glodde | 29/79 |
| 3,618,187 | 11/1971 | Jensen | 407/60 |
| 3,868,751 | 3/1975 | Holthuis | 29/78 |
| 4,019,234 | 4/1977 | Jensen et al. | 29/79 |
| 4,021,899 | 5/1977 | Jensen | 29/79 |

Primary Examiner—Leonidas Vlachos
Attorney, Agent, or Firm—Dennison, Meserole, Pollack & Scheiner

[57] ABSTRACT

A tool for rasping comprising a cylindrical drum rotatable in both directions around an axis, the drum being equipped with cutting elements which protrude exteriorly and are able to act in the two directions of rotation. The cutting elements are mounted on a series of movable bars disposed on the exterior surface of the drum parallel to the axis, each one of these bars having at least one transverse row of cutting elements. Each cutting element of a same row displays two parallel cutting edges provided at opposite acute angles with respect to the axis of the drum. The cutting elements of each of the rows present cutting edges which are essentially equal to those of adjacent rows but oppositely directed. The bars possess means for quick assembly onto the drum. The tool is used in preparing the exterior surface of a tire for retreading.

9 Claims, 4 Drawing Figures

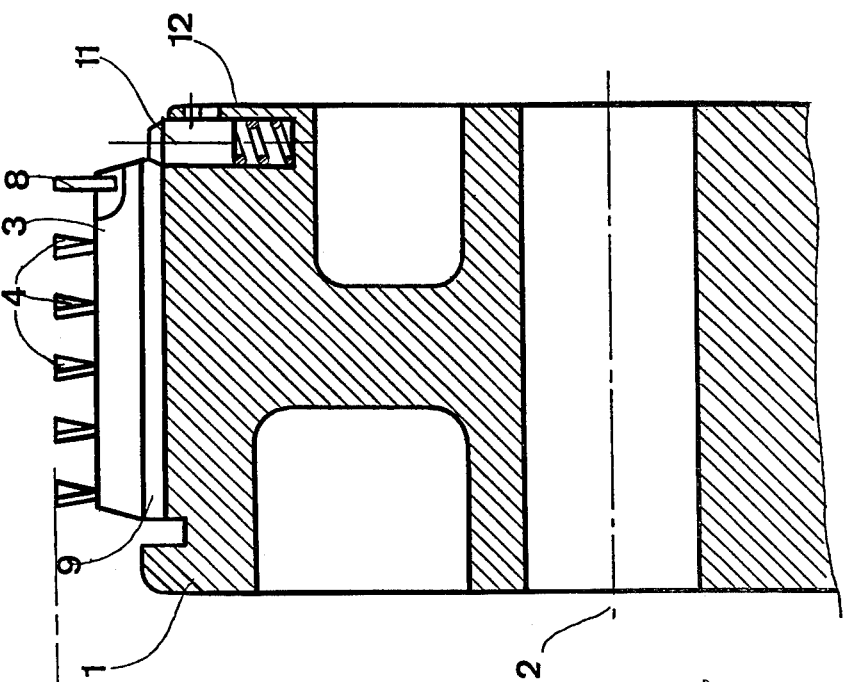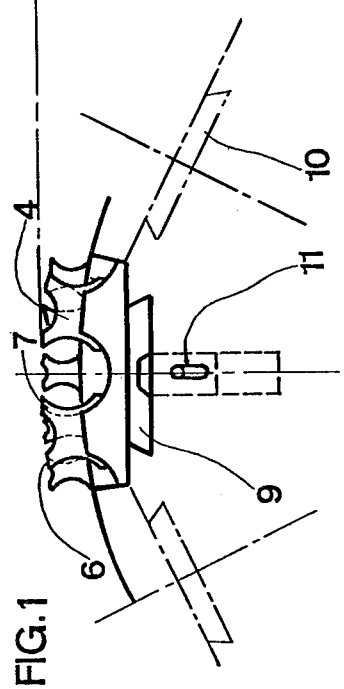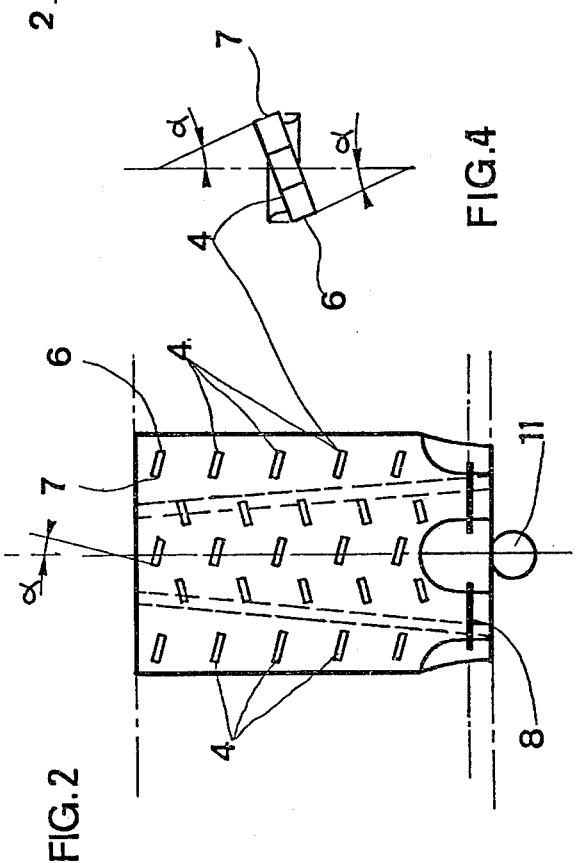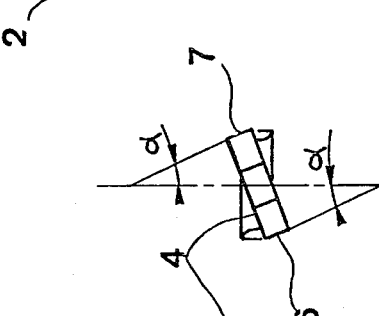

TOOL FOR RASPING

The present application concerns a rasping tool primarily for use in preparation of a tire for retreading.

Prior commonly owned U.S. Pat. application No. 839,358, filed Oct. 4, 1977, and now abandoned, describes a tool consisting of a cylindrical drum rotatable in both directions about its axis, and equipped with cutting elements which protrude toward the exterior and are able to act in both directions of rotation. The cutting elements are fixed onto an assembly of movable bars disposed regularly on the exterior surface of the drum, parallel to the axis. Each one of these bars carries at least one cutting element. The elements of each row of two neighboring bars are slightly shifted, one in relation to another in the direction parallel to the axis, in such a manner that the centers of the cutting elements are situated on helical arcs on paths traced about the drum and having the same axis as the drum.

Thus, the action of the cutting elements is effective on the entire surface of the tire to be rasped.

If one employs identical bars, as would be desirable for mass production, this system requires a shifting of the neighboring bars which leads to or requires a complex and delicate mounting/assembly.

The object of the present invention is to obtain an identical result with a simplified assembly.

According to the invention, each bar has at least one row of transverse cutting elements. Each cutting element of a same row presents two parallel cutting edges at oppositely directed acute angles with the axis of the drum. The cutting elements of an adjacent row also present two cutting edges making an acute angle with the axis of the drum essentially equal to that of the preceding row but in an opposite direction.

The invention will be better understood from the following detailed description of a particular and non-limiting embodiment of the invention illustrated in the attached drawings wherein:

FIG. 1, a side view of a bar mounted on the drum;

FIG. 2 is a top view of the same bar;

FIG. 3 is an enlarged cross-section view of the tool on a plane passing through the axis of the drum; and FIG. 4 is a top view of a cutting element.

The rasping tool comprises a cylindrical drum 1 rotatable about its axis 2 and being capable of high speed rotation in both directions of rotation.

On the exterior surface of the drum are mounted, at regular intervals, detachable bars 3, each one equipped with at least one row of equally spaced cutting elements 4.

The cutting elements 4 are preferably made of cemented hard particles, that is, hard particles such as carbides, nitrides, carbonitrides, borides, of a metal, or a mixture of metals, selected from Groups IV, V, and VI of the periodical classification of elements, cemented by a metal, or metals, selected from the Fe Group and/or the Cr Group. They will be designated later by the generic term "tungsten carbide". The cutting elements 4 include a first section inserted into the bar and attached thereto, and a second section protruding exterior of the bar, the second section comprising two parallel cutting edges 6 and 7. These cutting edges form an acute angle "$\alpha$" less than 45° with the axis of the drum. This is achieved, for example with cutting elements of an elongated form, by inclining these cutting elements at the angle "$\alpha$" in relation to the tangent of the cylindrical drum perpendicular to the axis of the drum. The cutting elements of a same transverse row are all inclined in the same manner or direction, in such a way that the cutting edges of these elements are essentially parallel.

The cutting elements of the neighboring row or rows, likewise having the cutting edges thereon, are similarly inclined in relation to the axis of the drum with the cutting edges at an angle essentially equal to "$\alpha$" but in the opposite direction. It is desirable that each bar carries an even number of rows in such a manner that, from one bar to another, the alternating of the inclinations of the cutting edges of the cutting elements continues.

The drum can also include peripheral cutting elements 8 on which the cutting edges are parallel to the axis and are used more particularly for the rasping of the sides of the tire.

The bars can be made of any material which assures a sufficiently solid anchoring of the cutting elements and a good mechanical holding thereof. They can be made by molding, forging, machining, etc. The fastening of the cutting elements to the bars can be accomplished by brazing, binding with a hoop or collar, insertion and swaging, use of a sealing alloy, mechanical fixing, or over-molding of the bar onto the cutting elements.

The system for mounting the bars on the drum should assure an easy mounting and dismounting. The bars are recessed or set into the drum about the periphery of the drum. Each bar comprises a dove-tailed section 9 of trapezoidal cross-section wherein the large base is located toward the interior of the drum and wherein the width decreases along a generatrix of the drum. This dove-tailed section 9 is received in a groove or slot 10 which is of a corresponding shape on the drum. The slot 10 has an open end through which the corresponding bar section 9 is received. This open end can be slightly enlarged to facilitate insertion of the bar with both the dove-tailed section 9 and the slot or groove 10 having a lengthwise diminishing taper from the open end inward for a snug interfit. The bar is held in place in the slot by a catch or pin 11 mounted in a socket or recess on the periphery of the drum at the open end of the groove or slot 10. The pin 11 is movable outwardly in a direction radially of the drum under the action of a compression spring system 12. By putting pressure on the pin 11, which can be simply applied manually, the pin moves or retracts in toward the interior of the drum and permits convenient mounting or dismounting of the bar. By releasing the pin, it moves outward to block the bar from moving outwardly of the slot in a transverse direction. Appropriate means, such as the projecting lug received in the vertical opening, as seen in FIGS. 1 and 3, will limit outward movement of the pin.

As an example, the cylindrical tool can have an exterior diameter of 290 mm and a width of 115 mm with 24 adjoining bars, each having five rows of five cutting elements.

The tool described herein presents the following main advantages:

quickness of taking up or disassembling; in the above given example, the assembly or disassembly can be done within 3 minutes instead of 20 to 25 minutes with the classical system comprising blades and pins.

ability to replace one or several detachable bars bearing worn or broken cutting elements by new bar(s), the tool remaining in place on the machine; this provides a considerable improvement in time use and productivity.

safety during taking up or down by avoiding the handling of heavy and/or bulky tools, with outside cutting elements.

great geometrical precision of cutting elements position so avoiding untrue run, vibrations, and so on, during use.

ease to taking up and down the bars without using special or common hand tools such as spanners, tongs, etc.

In order to prepare the exterior surface of a tire to be retreaded with such a tool, one works first on the rolling tread of the tire, then on the sides coming down from the main tread toward the side, the speed of rotation being on the order of 2,000 rpm. One can employ a similar tool for the sides but of a smaller size in order to remove a thinner layer, in the case of radial tires.

We clam:

1. A rasping tool, for use particularly in the preparation of the exterior surface of a tire to be retreaded, comprising a cylindrical drum rotatable in opposite directions on its axis, protruding cutting elements on the exterior surface of the drum, said cutting elements being able to act in both directions of rotation, an assembly of detachable bars disposed regularly about the exterior surface of the drum parallel to the drum axis, each one of the bars having at least one transverse row of cutting elements fixed thereto, each cutting element of a same row having two parallel cutting edges oriented in opposite directions relative to, and making the same acute angle with the axis of the drum, the cutting elements of an adjacent row equally presenting two cutting edges making, with the axis of the drum, angles essentially the same as the preceding row but oppositely directed, and means for a quick assembly of the detachable bars on the drum, said means for quick assembly comprising a dove-tail section on each bar which is received within a corresponding groove in the drum, said groove opening through a first side of the drum, the groove and dove-tail section each having a decreasing width from the first side of the drum to the other.

2. The rasping tool according to claim 1, including a catch mounted on the drum on the first side and outwardly movable, in diametrical direction by a spring assembly, to selectively block the groove at the opening through the first side and retain the dove-tail section in the groove.

3. The rasping tool according to claim 1 wherein the cutting elements are tungsten carbide.

4. The rasping tool according to claim 1 wherein the bars have an even number of transverse rows of cutting elements.

5. The rasping tool according to claim 4 wherein the drum includes cutting elements located around its periphery, with cutting edges parallel to its axis.

6. The rasping tool according to claim 1 wherein the drum includes cutting elements located around its periphery, with cutting edges parallel to its axis.

7. A rasping tool, for use particularly in the reparation of the exterior surface of a tire to be retreaded, comprising a cylindrical drum rotatable in opposite directions on its axis, protruding cutting elements on the exterior surface of the drum, said cutting elements being able to act in both directions of rotation, an assembly of detachable bars disposed regularly about the exterior surface of the drum parallel to the drum axis, each one of the bars having at least one transverse row of cutting elements fixed thereto, each cutting element of a same row having two parallel cutting edges oriented in opposite directions relative to, and making the same acute angle with the axis of the drum, the cutting elements of an adjacent row equally presenting two cutting edges making, with the axis of the drum, angles essentially the same as the preceding row but oppositely directed, and means for a quick assembly of the detachable bars on the drum, said means for quick assembly comprise a dove-tail section on each bar, a corresponding groove in the drum, said groove having an opening through a first side of the drum for slidably receiving said dove-tail section therethrough when assembling said bar on the drum, and removing said bar from the drum, and a pressure retractable catch mounted on the drum adjacent the first side thereof and spring biased to an outwardly moved position to selectively block the groove opening and retain the dove-tail section in the groove.

8. The rasping tool according to claim 7 wherein the bars have an even number of transverse rows of cutting elements.

9. The rasping tool according to claim 8 wherein the drum includes cutting elements located around its periphery, with cutting edges parallel to the drum axis.

* * * * *